(12) United States Patent
Bijon et al.

(10) Patent No.: US 11,057,491 B1
(45) Date of Patent: Jul. 6, 2021

(54) REMOTE EXECUTION USING A GLOBAL IDENTITY

(71) Applicant: Snowflake Inc., San Mateo, CA (US)

(72) Inventors: Khalid Zaman Bijon, Santa Cruz, CA (US); Damien Carru, New York, NY (US); Christopher Peter Child, Tiburon, CA (US); Eric Karlson, Alameda, CA (US); Zheng Mi, Palo Alto, CA (US)

(73) Assignee: Snowflake Inc., San Mateo, CA (US)

( * ) Notice: Subject to any disclaimer, the term of this patent is extended or adjusted under 35 U.S.C. 154(b) by 0 days.

(21) Appl. No.: 16/931,808

(22) Filed: Jul. 17, 2020

(51) Int. Cl.
| | | |
|---|---|---|
| *H04L 29/08* | (2006.01) | |
| *G06F 9/54* | (2006.01) | |
| *H04L 29/06* | (2006.01) | |
| *G06F 21/31* | (2013.01) | |
| *H04L 12/24* | (2006.01) | |

(52) U.S. Cl.
CPC ............ *H04L 67/306* (2013.01); *G06F 9/547* (2013.01); *G06F 21/31* (2013.01); *H04L 41/50* (2013.01); *H04L 41/5041* (2013.01); *H04L 63/08* (2013.01); *H04L 63/0815* (2013.01); *H04L 63/102* (2013.01); *H04L 63/20* (2013.01); *H04L 67/02* (2013.01); *H04L 67/10* (2013.01); *H04L 67/1097* (2013.01); *H04L 67/2861* (2013.01); *H04L 67/32* (2013.01)

(58) Field of Classification Search
CPC ....... H04L 67/306; H04L 63/20; H04L 41/50; H04L 67/32; H04L 63/0815; H04L 41/5041; H04L 63/08; H04L 67/2861; H04L 67/02; H04L 63/102; H04L 67/1097; H04L 67/10; G06F 21/31; G06F 9/547
See application file for complete search history.

(56) References Cited

U.S. PATENT DOCUMENTS

| | | | | |
|---|---|---|---|---|
| 9,781,122 | B1 * | 10/2017 | Wilson ................ | H04L 63/0807 |
| 10,715,458 | B1 * | 7/2020 | Cahill ................... | H04L 63/102 |
| 2011/0238737 | A1 * | 9/2011 | Agrawal ............... | G06F 9/5072 709/203 |
| 2012/0011578 | A1 * | 1/2012 | Hinton ................ | H04L 63/0815 726/8 |
| 2013/0268674 | A1 * | 10/2013 | Bailey ................. | H04L 67/1002 709/226 |
| 2013/0290190 | A1 * | 10/2013 | Maris .................... | G06Q 20/20 705/50 |
| 2014/0082156 | A1 * | 3/2014 | Jagtap .................. | G06F 9/5027 709/220 |
| 2016/0127254 | A1 * | 5/2016 | Kumar ................... | H04L 67/10 709/226 |
| 2016/0134619 | A1 * | 5/2016 | Mikheev ............. | H04L 63/0815 726/8 |

(Continued)

*Primary Examiner* — Ramy M Osman

(74) *Attorney, Agent, or Firm* — Schwegman Lundberg & Woessner, P.A.

(57) ABSTRACT

Embodiments of the present disclosure may provide a streamlined process for performing operations, such as data sharing and data replication, using multiple accounts. A global identity (also referred to as an organization user) may be employed, where the global identity may have access to multiple accounts across the same or different deployments. The global identity may switch between accounts from its login session and perform various tasks in the context of different accounts without undergoing further authentication.

27 Claims, 10 Drawing Sheets

(56) References Cited

U.S. PATENT DOCUMENTS

| | | | |
|---|---|---|---|
| 2017/0331813 A1* | 11/2017 | Lander | H04L 63/0815 |
| 2017/0331829 A1* | 11/2017 | Lander | H04L 67/10 |
| 2018/0048709 A1* | 2/2018 | Martini | H04L 63/20 |
| 2018/0075231 A1* | 3/2018 | Subramanian | H04L 63/0815 |
| 2018/0077138 A1* | 3/2018 | Bansal | H04L 63/0815 |
| 2018/0083889 A1* | 3/2018 | Kuchibhotla | H04L 41/0816 |
| 2018/0234523 A1* | 8/2018 | Jose | H04L 67/10 |
| 2019/0306138 A1* | 10/2019 | Carru | H04L 63/08 |
| 2019/0372847 A1* | 12/2019 | Huh | H04L 63/08 |
| 2020/0259837 A1* | 8/2020 | Shah | H04L 61/1541 |
| 2020/0267090 A1* | 8/2020 | Cahill | H04L 67/146 |
| 2020/0304454 A1* | 9/2020 | Yu | H04L 63/08 |
| 2020/0358876 A1* | 11/2020 | Kulkarni | H04L 67/025 |

* cited by examiner

REMOTE EXECUTION USING A GLOBAL IDENTITY

TECHNICAL FIELD

The present disclosure generally relates to remote execution of tasks associated with different accounts.

BACKGROUND

Database and other data processing systems may be implemented in different configurations and arrangements. For example, cloud database systems may be provided through a cloud platform, which allows organizations and users to store, manage, and retrieve data from the cloud. An organization may utilize deployments in different regions in addition to using different types of deployments. For instance, cloud database systems may be implemented as a public deployment, where multiple accounts can share processing resources and/or storage. Cloud database systems may also be implemented as a private deployment, where processing resources and/or storage are dedicated and isolated.

However, in such systems, performing some operations can be cumbersome. Some operations can include the involvement of multiple accounts. For example, an operation may include performing a first task using a first account and then performing a second task using a second account and so on. Thus, a user would have to log into the first account to perform the first task, log off, and then log into the second account to perform the second task and so on, leading to an inefficient process.

BRIEF DESCRIPTION OF THE DRAWINGS

Various ones of the appended drawings merely illustrate example embodiments of the present disclosure and should not be considered as limiting its scope.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Embodiments of the present disclosure may provide a streamlined process for performing operations, such as data sharing and data replication, using multiple accounts. A global identity (also referred to as an organization user) may be employed, where the global identity may have access to multiple accounts across the same or different deployments. The global identity may switch between accounts from its login session and perform various tasks in the context of different accounts without undergoing further authentication. From the user perspective, execution of the tasks may look the same irrespective of which account is used by the global identity because the login session may be used for all task executions. On the backend, however, remote sessions and proxy users may be employed to perform tasks using different accounts. Thus, those tasks may be performed in the context of other accounts from the login session.

Figure 1:
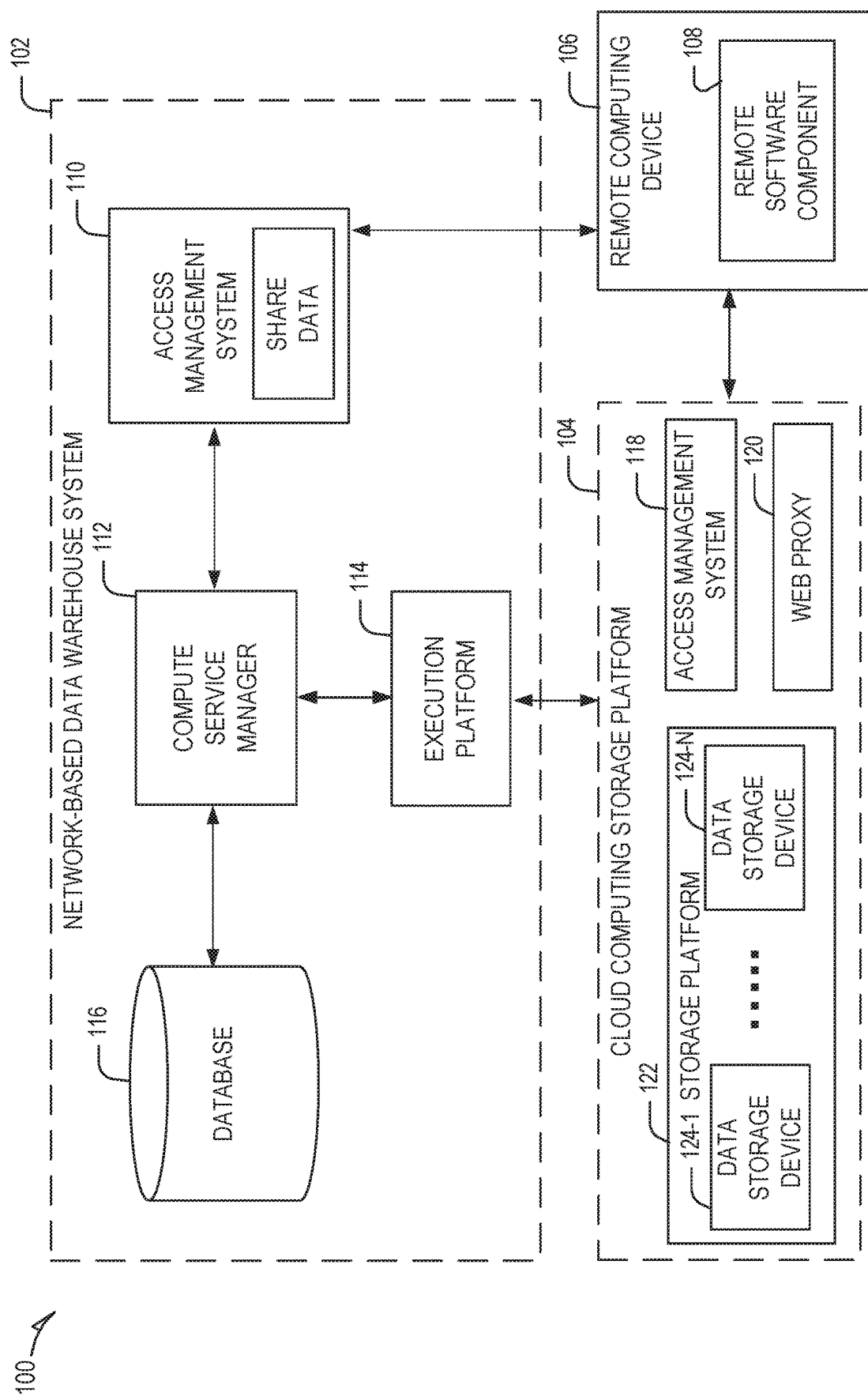
FIG. 1 illustrates an example computing environment in which a network-based data warehouse system can implement streams on shared database objects, according to some example embodiments.

FIG. 1 illustrates an example shared data processing platform 100, in accordance with some embodiments of the present disclosure. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based data warehouse system 102, a cloud computing storage platform 104 (e.g., a storage platform, an AWS® service, Microsoft Azure®, or Google Cloud Services®), and a remote computing device 106. The network-based data warehouse system 102 is a network-based system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based data warehouse system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based data warehouse system 102. The remote software component 108 comprises a set of machine-readable instructions (e.g., code) that, when executed by the remote computing device 106, cause the remote computing device 106 to provide certain functionality. The remote software component 108 may operate on input data and generates result data based on processing, analyzing, or otherwise transforming the input data. As an example, the remote software component 108 can be a data provider or data consumer that enables database tracking procedures, such as streams on shared tables and views, as discussed in further detail below.

The network-based data warehouse system 102 comprises an access management system 110, a compute service manager 112, an execution platform 114, and a database 116. The access management system 110 enables administrative users to manage access to resources and services provided by the network-based data warehouse system 102. Administrative users can create and manage users, roles, and groups, and use permissions to allow or deny access to resources and services. The access management system 110 can store share data that securely manages shared access to the storage resources of the cloud computing storage platform 104 amongst different users of the network-based data warehouse system 102, as discussed in further detail below.

The compute service manager 112 coordinates and manages operations of the network-based data warehouse system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based data warehouse system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-n that are part of a cloud computing storage platform 104. In some embodiments, data storage devices 124-1 to 124-n are cloud-based storage devices located in one or more geographic locations. For example, data storage devices 124-1 to 124-n may be part of a public cloud infrastructure or a private cloud infrastructure. Data storage devices 124-1 to 124-n may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based data warehouse system 102 and the access management system 118 of the cloud computing storage platform 104 can communicate and share information so as to enable access and management of resources and services shared by users of both the network-based data warehouse system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based data warehouse system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based data warehouse system 102. The decoupling of the computing resources from the data storage devices 124-1 to 124-n supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based data warehouse system 102 is dynamic and supports regular changes to meet the current data processing needs.

During typical operation, the network-based data warehouse system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-n in the cloud computing storage platform 104. Thus, the computing resources and cache resources are not restricted to specific data storage devices 124-1 to 124-n. Instead, all computing resources and all cache resources may retrieve data from, and store data to, any of the data storage resources in the cloud computing storage platform 104.

Figure 2:
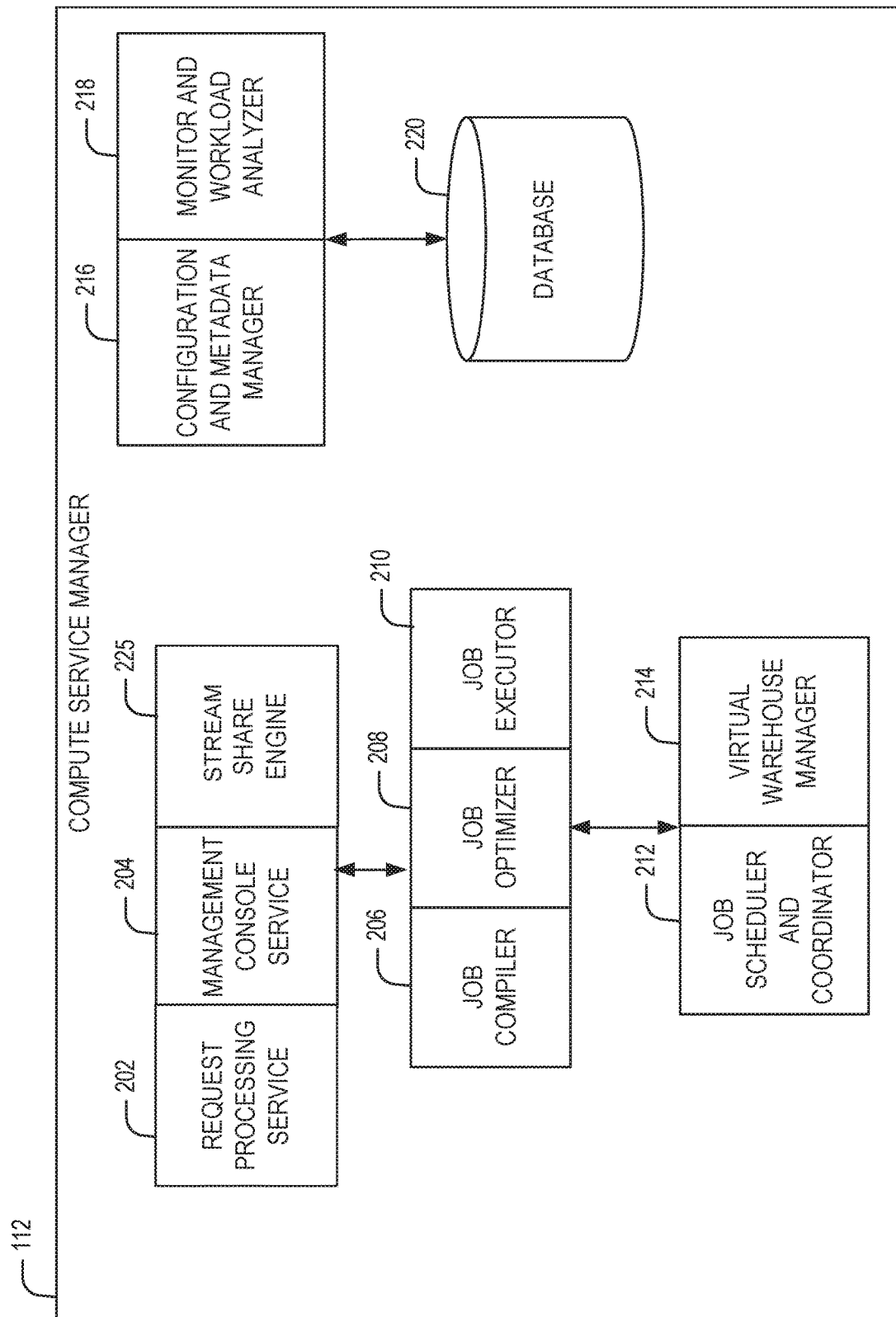
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail, below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, a operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based data warehouse system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based data warehouse system 102. For example, data storage device 220 may represent caches in execution platform 114, storage devices in cloud computing storage platform 104, or any other storage device.

Figure 3:
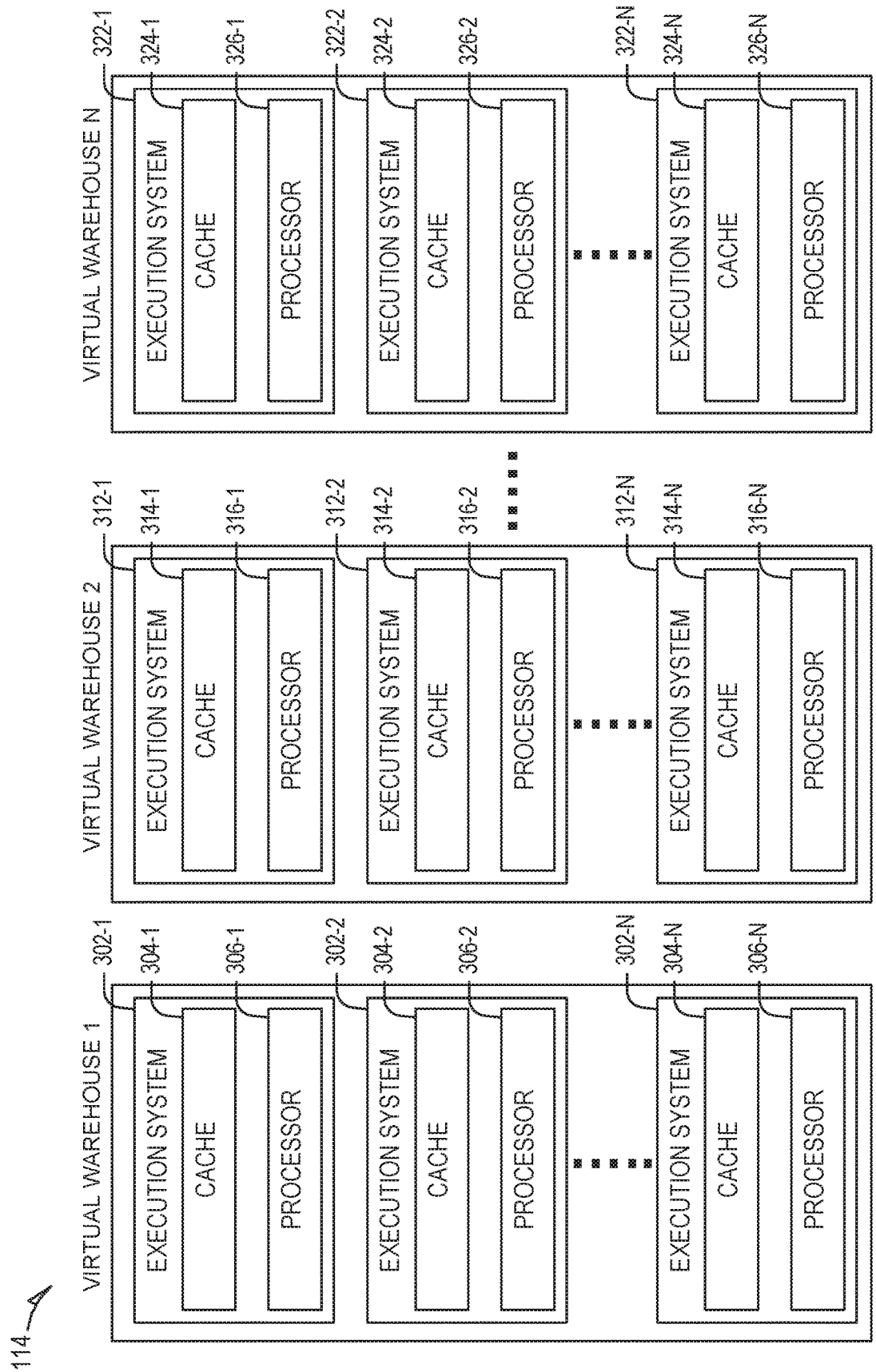
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual warehouse 1, virtual warehouse 2, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-n shown in FIG. 1. Thus, the virtual warehouses are not necessarily assigned to a specific data storage device 124-1 to 124-n and, instead, can access data from any of the data storage devices 124-1 to 124-n within the cloud computing storage platform 104. Similarly, each of the execution nodes shown in FIG. 3 can access data from any of the data storage devices 124-1 to 124-n. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-n. Execution node 302-1 includes a cache 304-1 and a processor 306-1. Execution node 302-2 includes a cache 304-2 and a processor 306-2. Execution node 302-n includes a cache 304-n and a processor 306-n. Each execution node 302-1, 302-2, and 302-n is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-n. Execution node 312-1 includes a cache 314-1 and a processor 316-1. Execution node 312-2 includes a cache 314-2 and a processor 316-2. Execution node 312-n includes a cache 314-n and a processor 316-n. Additionally, virtual warehouse 3 includes three execution nodes 322-1, 322-2, and 322-n. Execution node 322-1 includes a cache 324-1 and a processor 326-1. Execution node 322-2 includes a cache 324-2 and a processor 326-2. Execution node 322-n includes a cache 324-n and a processor 326-n.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-n at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
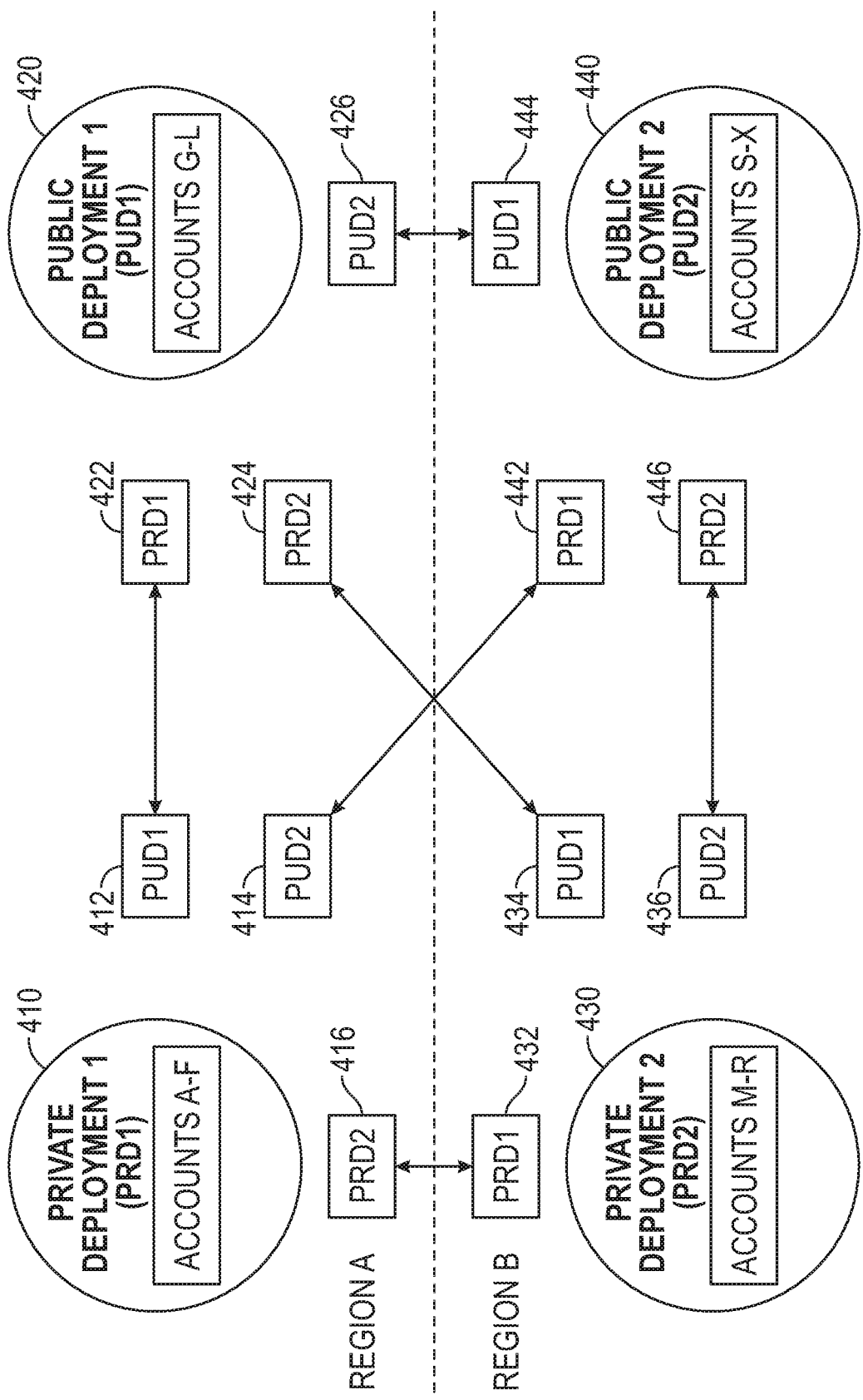
FIG. 4 is a block diagram illustrating a multiple deployment environment, according to some example embodiments.

FIG. 4 shows an example multiple deployment environment, according to some example embodiments. A deployment may include multiple components such as a metadata store, a front-end layer, a load balancing layer, a data warehouse, etc., as discussed above with respect to FIGS. 1-3. The multiple deployment environment may be provided for one or more organizations and may include a plurality of public and private deployments. A public deployment may be implemented as a multi-tenant environment, where each tenant or account shares processing and/or storage resources. For example, in a public deployment, multiple accounts may share a metadata store, a front-end layer, a load balancing layer, a data warehouse, etc. A private deployment, on the other hand, may be implemented as a dedicated, isolated environment, where processing and/or storage resources may be dedicated. Thus, private deployments may offer better security as well as better performance in some configurations.

In FIG. 4, a private deployment 1 (PRD1) 410 may be provided in cloud provider region A, and a public deployment 1 (PUD1) 420 may also be provided in cloud provider region A. A private deployment 2 (PRD2) 430 may be provided in another cloud provider region B, and a public deployment 2 (PUD2) 440 may also be provided in cloud provider region B. The cloud provider regions A and B may be different geographic regions, for example.

In this example, the different deployments 410, 420, 430, 440 are configured to communicate with each other. For example, they can each send/receive messages to/from each other in a global messaging layer. To do so, each deployment may include deployment objects corresponding to the other communicatively coupled deployments, representing links to the target deployments. For example, PRD1 410 may include a PUD1 deployment object 412, a PUD2 deployment object 414, and a PRD2 deployment object 416. PUD1

420 may include a PRD1 deployment object 422, a PRD2 deployment object 424, and a. PUD2 deployment object 426. PRD2 430 may include a PRD1 deployment object 432, a PUD1 deployment object 434, and a PUD2 deployment object 436. PUD2 440 may include a PRD1 deployment object 442, a PUD1 deployment object 444, and a PRD2 deployment object 446. In an embodiment, communication between deployments may be performed using a metadata store. For example, one deployment may write a message to the metadata store, and another deployment may read that message from the metadata store.

Moreover, each deployment may have different accounts associated with it. For example, PRD1 410 may have Accounts A-F associated with it; PUD1 420 may have Accounts G-L associated with it; PRD2 430 may have Accounts M-R associated with it; and PUD2 440 may have Accounts S-X associated with it. Certain operations, such as replicating data or sharing data, may involve tasks to be performed by different accounts in the same deployment or different deployments.

Global identities (also referred to as organization users) and remote processing, as described herein, may be utilized to streamline performance of such operations. A global identity may be an identity that may be known and have access to multiple accounts. The accounts may be within an organization and may be associated with the same deployment or different deployments.

Figure 5:
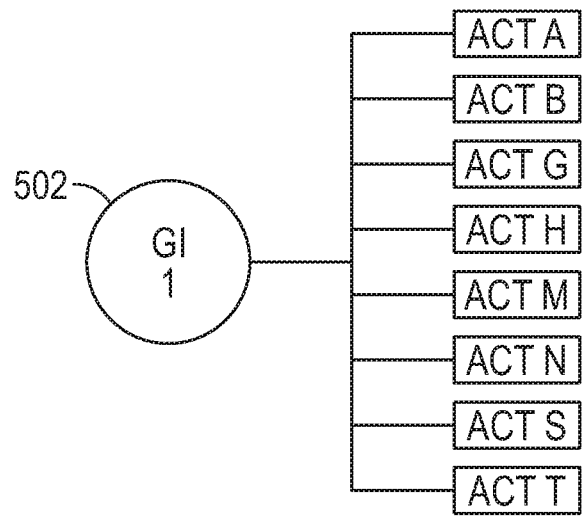
FIG. 5 is a block diagram illustrating a relationship tree of a global identity, according to some example embodiments.

FIG. 5 shows an example relationship of a global identity (GI 1) 502, according to some example embodiments. The global identity (GI 1) 502 may be associated with multiple selected accounts and is able to access those accounts without further authentication. Once a global identity is authenticated, it may access different accounts associated with that global identity and perform tasks in the context of those accounts without providing further authentication for those different accounts. That is because the global identity may be authenticated using a global authentication mechanism, which is an authentication mechanism that is trusted across an organization. The global authentication mechanism may create a one-way trust relationship (also referred to as trusting domain or trusted domain) in which organization accounts may trust an identity assertion made by the global authentication mechanism. As such, each mapped account may allow the execution of tasks and statements without further authentication based on the trusted identity assertion from the global authentication mechanism.

GI 1 502 may be mapped to different accounts across different deployments, cloud providers, and/or regions. For example, referring back to the accounts of FIG. 4, GI 1 502 may be mapped to Accounts A and B from PRD1 410, Accounts G and H from PUD1 420, Accounts M and N from PRD2 430, and Accounts S and T from PUD2 440. The mapped accounts for a global identity may be set by an administrator, who is a user authorized to manage organization-level entities and metadata. Additionally or alternatively, the mapped accounts for a global identity may be set based on a set of policy rules. For example, policy rules may be set so that certain type(s) of accounts are automatically mapped to certain global identities. For example, a policy rule may automatically map all development type accounts in an organization to a select global identity, regardless of the region or deployment. Thus, a user may log in as the selected global identity, may have access to all development accounts in the organization and may perform tasks in the context of any of those development accounts. Moreover, if a new development account is created within that organization, that new development account may be automatically mapped to the selected global identity.

Figure 6:
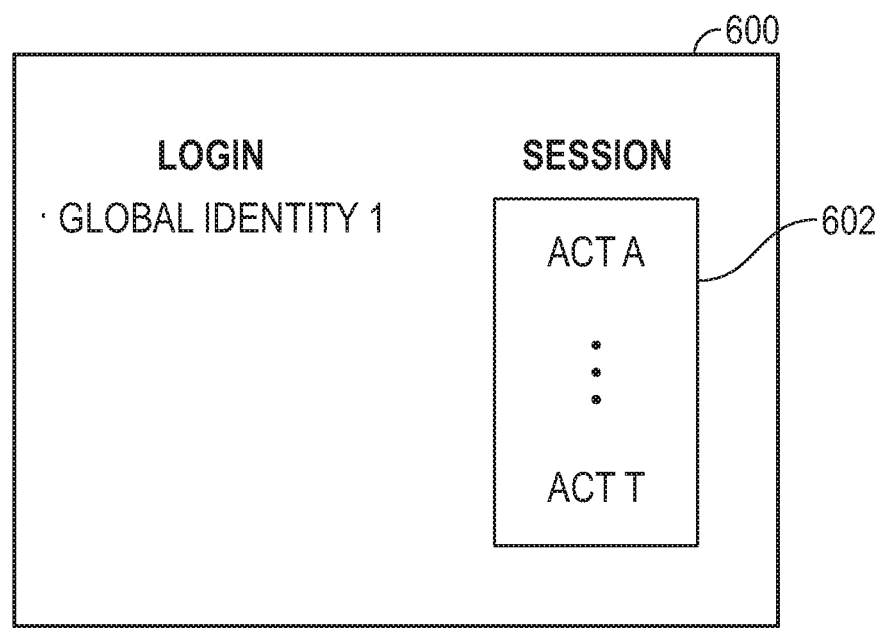
FIG. 6 is a block diagram illustrating a login session, according to some example embodiments.

After a global identity is authenticated, a login session may be established. For example, the login session may be associated with an account and a user ID. The login session may provide access to the mapped accounts associated with the global identity. FIG. 6 shows a login session 600 of a global identity, according to some example embodiments. The login session 600 may provide information about the mapped accounts 602.

Figure 7:
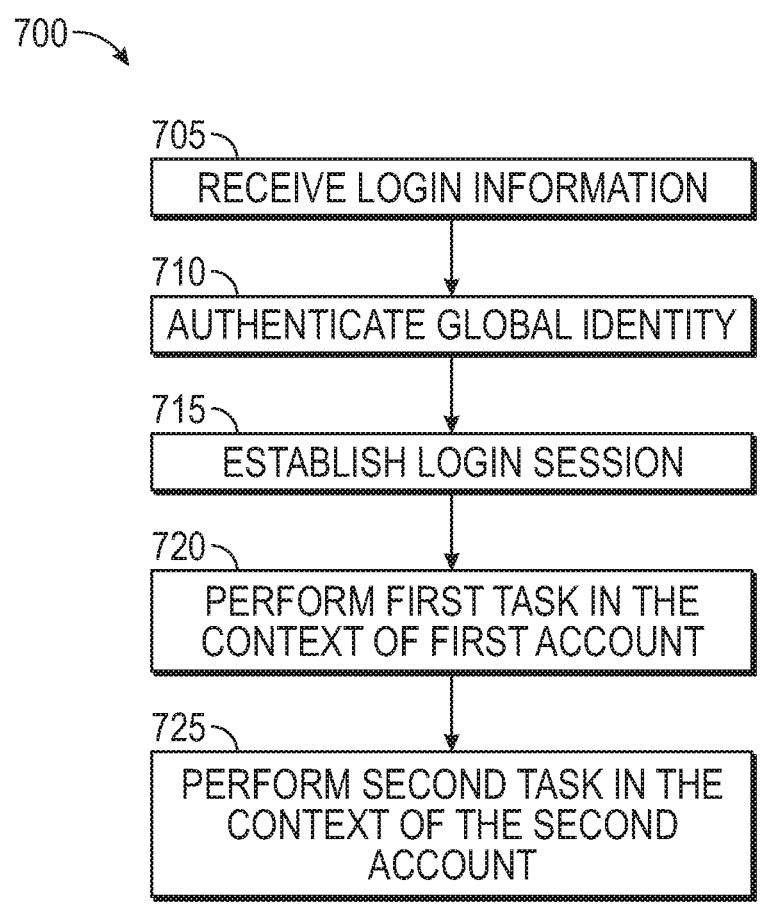
FIG. 7 shows a flow diagram for performing an operation using a global identity, according to some example embodiments.

Next, different actions able to be performed by the global identity are described. FIG. 7 shows a flow diagram of a method 700 for performing an operation using a global identity, according to some example embodiments. At operation 705, login information for a user in an organization may be received. The login information may be associated with a global identity as defined by the organization. At operation 710, the login information for the global identity (or organization user) may be authenticated using a global authentication mechanism, as described herein. For example, a two-factor authentication may be employed for authenticating a global identity. At operation 715, a login session may be established. The login session may provide access to the mapped accounts for the global identity without further authentication. That is, the user may access and perform tasks in the context of the mapped accounts without having to provide further authentications for those accounts because of the trust relationship established by the global authentication mechanism.

At operation 720, from the login session, a first task may be performed in the context of a first mapped account from the set of mapped accounts of the global identity. As explained in further detail below, remote processing may be employed to execute the first task by the deployment associated with the first account.

At operation 725, also from the login session, a second task may be performed in the context of a second mapped account from the set of mapped accounts of the global identity. As explained in further detail below, remote processing may be employed to execute the second task by the deployment associated with the second account. In an embodiment, the deployments associated with the first and second accounts may be the same deployment or different deployments. Therefore, a single user may perform multiple tasks using different accounts from a single login session. Thus, global identities and remote processing provide a streamlined interface for a user to perform multiple tasks across different accounts.

In an embodiment, the different tasks may be part of a larger operation, such as data replication or data sharing. For example, using a global identity, a database may be replicated using a single login session. First, using a first mapped account of the global identity, a master database may be created and replication of that database may be enabled. Next, using a second mapped account of the global identity, a database may be created, linked to the master database so that it is a copy of the master database.

The above description primarily focuses on the frontend (e.g., what the user sees). Next, the backend operations are described. From the login session, an organization user may request execution of some statements to be performed in the context of a mapped account. In the backend, this may be done by using a "use account" statement, which may indicate to the login session that subsequent statements should be executed in the context of the identified account. A remote session may be created and then used to execute those subsequent statements. The remote session may be a persistent session. Remote sessions may be maintained by a session pool, which stores information regarding active remote sessions. Remote sessions may be provided in parallel in the session pool of the login session so that users may switch from one account to another.

Figure 8:
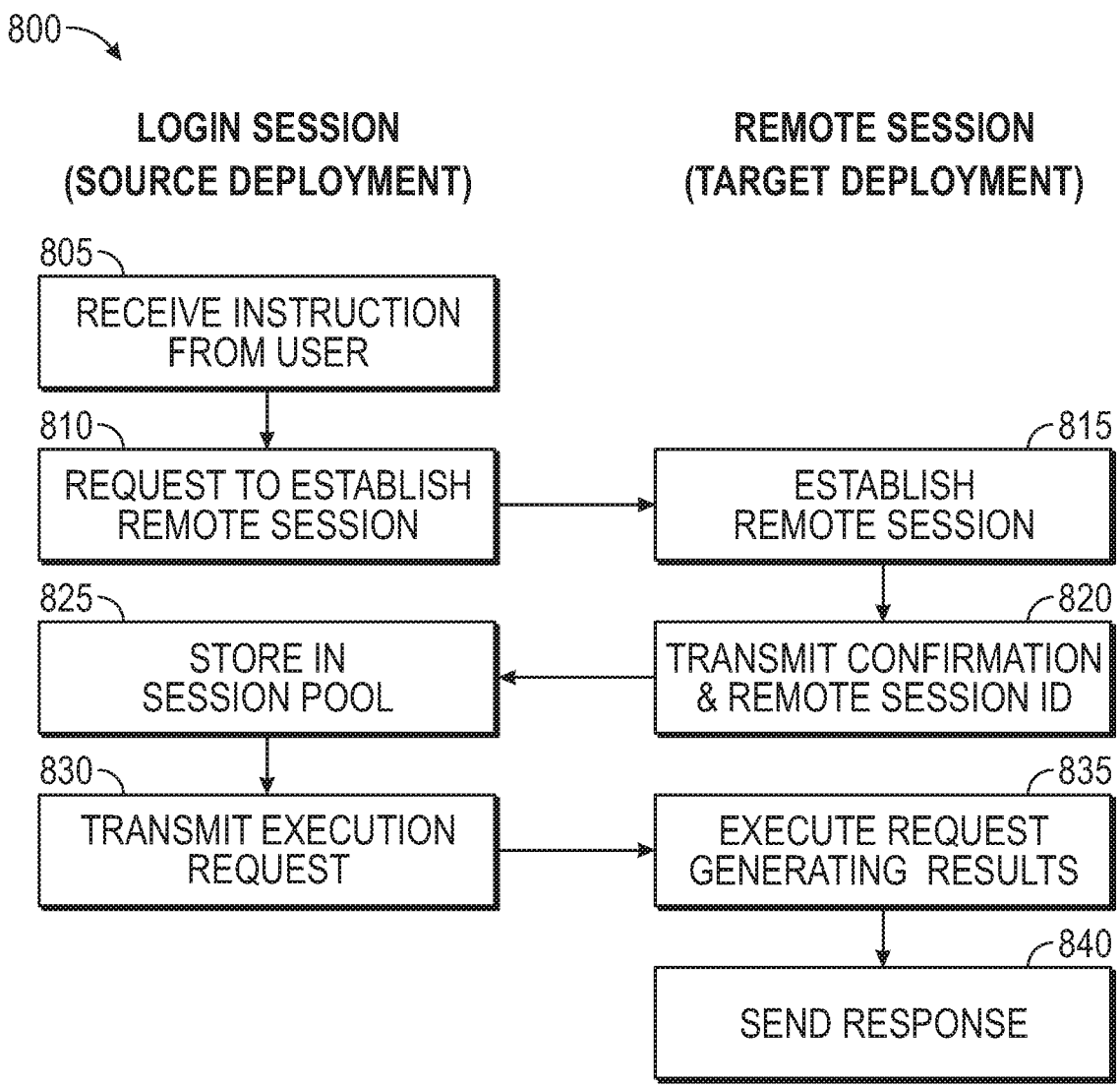
FIG. 8 shows a flow diagram for remote processing, according to some example embodiments.

FIG. 8 shows a flow diagram of a method 800 for remote processing, according to some example embodiments. Method 800 may be performed after authentication of a global identity and the establishment of a login session, as described above. At operation 805, an instruction from the organization user (logged in as the global identity) is received in a login session at a source deployment (e.g., a global service (OS)). The instruction may include a command or statement of execution associated with one of the mapped accounts (e.g., Account A). For example, the instruction may be a SQL statement.

At operation 810, the source deployment may transmit a request to establish a remote session to deployment associated with Account A. The target deployment may be the same as the source deployment or may be a different deployment. The remote session may refer to remote in the context of using another account. The request may be sent over the global messaging layer. The request may include one or more parameters, including an account name (for the organization user), the organization username, session parameters, and/or an authentication token. The authentication token may be a single sign-on (SSO) token to verify the identity of the organization user.

At operation 815, the deployment associated with Account A may receive the request and may establish a remote session. The remote session may be given a remote session ID. The deployment associated with Account A may also establish a proxy user associated with the organization user. The proxy user may behave like a local user of the deployment. In an embodiment, the username for the proxy user may be the username of the organization user. However, at least one property value may be associated with the proxy user that indicates that the proxy user is standing in for the organization user.

At operation 820, the deployment associated with Account A may transmit confirmation to the source deployment regarding the establishment of the remote session. The confirmation may include the status of the remote session (e.g., established/failed) and the remote session ID. At operation 825, the remote session ID may be stored in a session pool associated with the login session. The session pool may maintain data regarding the set of remote sessions that have been established for the login session. For example, the session pool may include information regarding other remote sessions associated with other mapped accounts. The session pool may be maintained at the backend, and the user may be unaware of it.

At operation 830, the source deployment may transmit an execution request to the deployment associated with Account A. For example, the execution request may include a request to execute a statement and/or query execution task. The request may include one or more parameters, including the remote session ID and the statement/execution task ID.

At operation 835, in response to receiving the execution request, the deployment associated with Account A may use the established remote session and proxy user to execute the request. If the execution generates results, those result sets may be stored, for example, in a cloud storage.

At operation 840, the deployment associated with Account may send a response to the execution request to the source deployment. The response may include or be indicative of the results of the execution. For an execution statement example, the response may include a status (e.g., started/failed), and an execution task ID. For a query execution task, the response may include task status (e.g., in-progress/completed), a task return code, and a task result set ID. The task result set ID may be used to retrieve the result set, for example, from the cloud storage.

Additional remote sessions may be established for the other mapped accounts of the global identity and other tasks may be executed on those established remote sessions based on requests by the user. Information regarding those remote sessions may be stored and maintained in the session pool of the login session. For example, operations 805-840 may be performed to initially establish a remote session and execute a first task in that remote session. Moreover, once a remote session is established, other tasks may be executed using that remote session by retrieving information from the session pool. For example, for additional tasks associated with an established remote session, operations 825-840 may be performed.

In an embodiment, the organization user may cancel an execution task. For example, in response to an instruction to cancel an execution task from the organization user, the source deployment may transmit a cancellation request to the deployment associated with the account being used for execution. The cancellation request may include one or more parameters, including the remote session ID and the execution task ID. In response to the cancellation request, the deployment may use the identified remote session to cancel the identified execution task. The deployment may transmit a response, which may include a status of the request (e.g., cancelled/failure). In another embodiment, no response may be sent in response to the cancellation request.

The user may also create/use session-local state information, such as temporary tables, session variables, session parameters, etc. For example, a user may create one or more temporary tables during the login session. These temporary tables may be available for the duration of the login session. The temporary tables may be created in the login session (e.g., for tasks performed locally) and/or in remote sessions. The temporary tables may be seen by the organization user even as the backend may switch from account to account. The use of session pools to re-use already established remote sessions for other tasks when switching between different mapped accounts that were previously used may ensure that temporary tables created in a remote session will continue to exist for the duration of the login session.

Consistency may be maintained between the login session and the one or more remote sessions in the session pool. Session state information may be maintained across the different remote sessions. This may include session parameter information and also state information, such as query results, such that they are available across the different sessions. For example, changes made to the login session may be replicated to all active remote sessions in the session pool. An alter session may be executed in the login session and may also be sent to each active remote session for execution as well so that all remote sessions may reflect the indicated change in the alter session command. Moreover, new remote sessions established after the alter session command may be established and initialized in a way to reflect the alter session command.

A login session may maintain an established remote session as active in the session pool. In an embodiment, the login session may perform refresh operations to maintain the established remote session active. In an embodiment, a remote session may time out and may be removed from the list of active sessions in the session pool.

A remote session may be terminated. For example, the login session may wish to terminate a remote session. To terminate a remote session, the login session may transmit a termination request to the deployment associated with the account being used for execution. The termination request may include one or more parameters, including the remote session ID. In response to the termination request, the deployment may terminate the remote session. The deployment may transmit a response, which may include a status of the request (e.g., terminated/failure). In another embodiment, no response may be sent in response to the termination request.

Moreover, all active remote sessions may be terminated at the termination of the login session. The login session may transmit termination requests to all active remote sessions at its own termination.

Figure 9A:
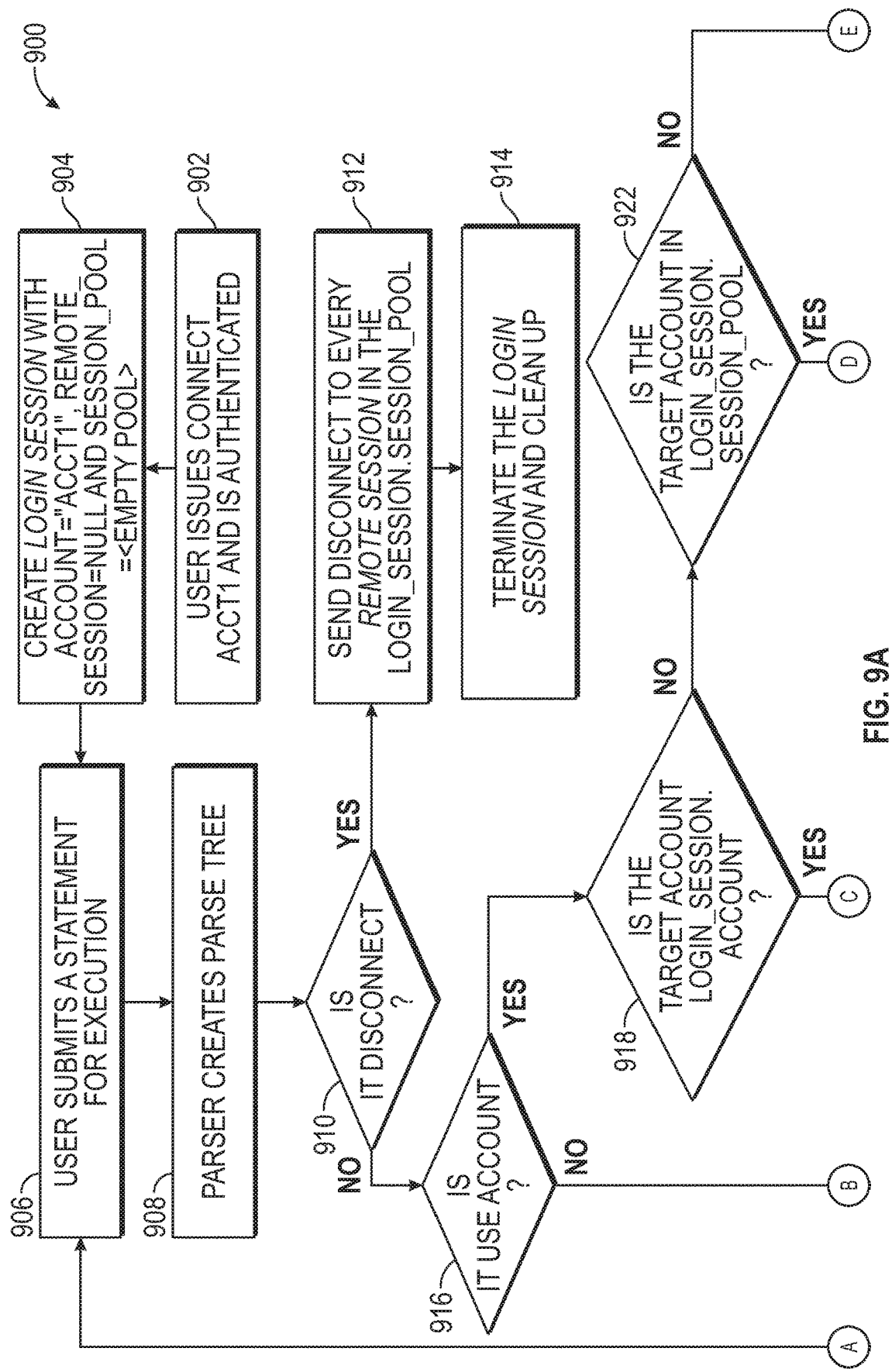
FIGS. 9A-9B show a flow diagram for operating a login session, according to some example embodiments.
Figure 9B:
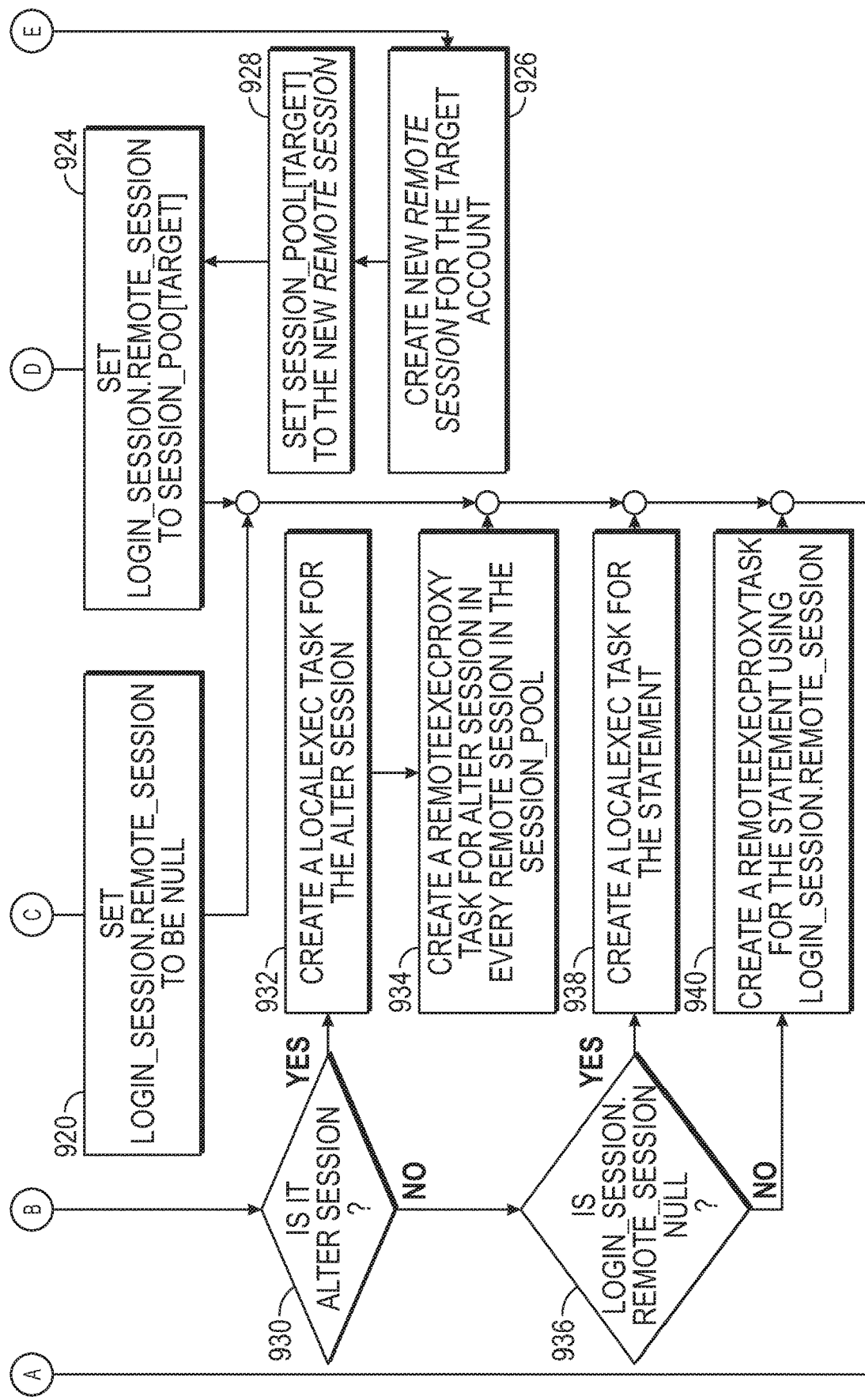

FIGS. 9A-9B illustrate a flow diagram of a method 900 for operating a login session for an organization user, according to some example embodiments. At operation 902, the user issues a request to connect to an account (CONNECT acct 1), and the source deployment may receive the request and authenticate the user credentials. The source deployment may authenticate the user as an organization user (global identity) using a global authentication mechanism, as described herein.

At operation 904, a login session may be created for "acct 1." Since the login session is just created, there may be no active remote sessions. Hence, the value for remote session is set to null, "remote_session=null," and the session pool is empty "session_pool"=<empty pool." At operation 906, the user may submit a statement for execution, such as a SQL statement. At operation 908, the statement may be parsed to create a parse tree.

Next, the source deployment may determine a task associated with the statement. In operation 910, the source deployment may check if the statement includes a request to disconnect or terminate the login session, "DISCONNECT." At operation 912, if the statement includes a request to disconnect/terminate, the login session may send a disconnect/terminate request to every remote session, if any, in the session pool. At operation 914, the login session may be terminated and a cleanup operation may be performed. For example, the cleanup operation may include deleting any temporary tables created during the login session, as described herein.

If the statement does not include a request to disconnect/terminate, the source deployment may check if the statement includes a request to use a mapped account of the global identity, "USE ACCOUNT," at operation 916. At operation 918, if the statement includes a "use account" request, the login session checks if the target account is the login session account, e.g., acct 1. At operation 920, if the target account is the login session account, the remote session register may be set to null (login_session.remote_session=null). The method 900 may then move on to the next user statement (e.g., operation 906). If however, the target account is not the login session account, the login session may then check if the target account is already in the session pool at operation 922. At operation 924, if the target account is already in the session pool (and therefore may have a remote session ID), login_session.remote_session may set to the target account ("session_pool[target]"). The method 900 may then move on to the next user statement (e.g., operation 906).

If the target account is not in the session pool, a new remote session may be created for the target account at operation 926, as described herein. At operation 928, the "session_pool[target]" register may then be set to the newly created remote session, and then method 900 may proceed to operation 924.

If the statement does not include a request to use account request (operation 916), the source deployment may check if the statement includes a request to alter the login session, "ALTER SESSION," at operation 930. At operation 932, if the statement includes a request to alter the login session, a local execution task may be created to execute the alter session request. At operation 934, a proxy task for each active remote session in the session may be created so that all active remote sessions are modified based on the alter session request.

If the statement does not include an alter session request, the source deployment may then determine the request is for the execution of a task, so the login session may check if the task is for the login session or a remote session by checking the value of the "login_session.remote_session" at operation 936. If that register is null (e.g., the task is for the login session), a local execution task may be created for the statement at operation 938. If the register is not null, a proxy task may be created for the identified remote session at operation 940. The method 900 may then move on to the next user statement (e.g., operation 906).

Figure 10:
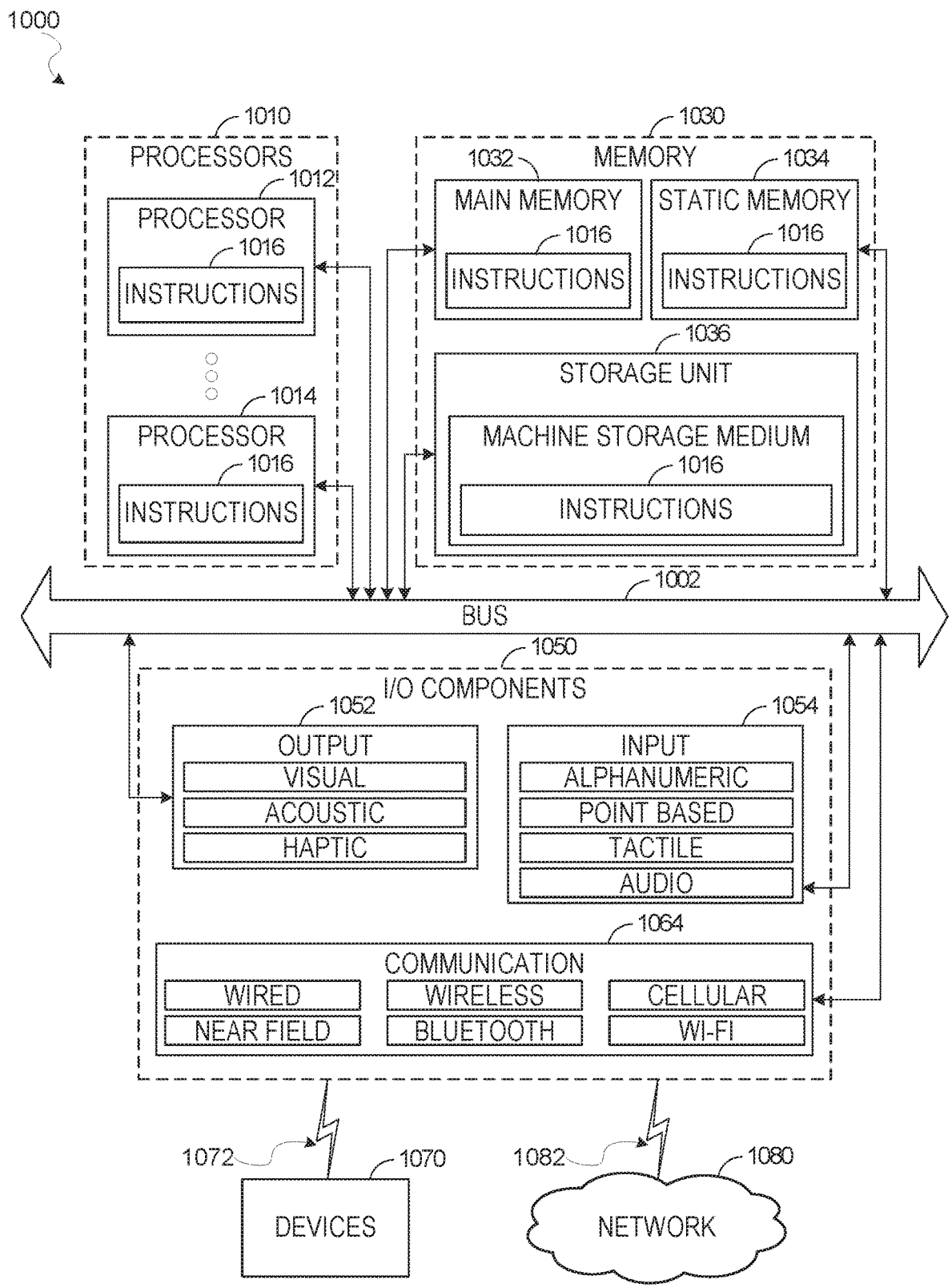
FIG. 10 illustrates a diagrammatic representation of a machine in the form of a computer system within which a set of instructions may be executed for causing the machine to perform any one or more of the methodologies discussed herein, in accordance with some embodiments of the present disclosure.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute any one or more operations described herein. As another example, the instructions 1016 may cause the machine 1000 to implemented portions of the data flows described herein. In this way, the instructions 1016 transform a general, non-programmed machine into a particular machine 1000 (e.g., the remote computing device 106, the access management system 110, the compute service manager 112, the execution platform 114, the access management system 118, the Web proxy 120, remote computing device 106) that is specially configured to carry out any one of the described and illustrated functions in the manner described herein.

In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 includes processors 1010, memory 1030, and input/output (I/O) components 1050 configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors 1010 that may comprise two or more independent processors (sometimes referred to as "cores") that may execute instructions 1016 contemporaneously. Although FIG. 10 shows multiple processors 1010, the machine 1000 may include a single processor with a single core, a single processor with multiple cores (e.g., a multi-core processor), multiple processors with a single core, multiple processors with multiple cores, or any combination thereof.

The memory 1030 may include a main memory 1032, a static memory 1034, and a storage unit 1036, all accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 include components to receive input, provide output, produce output, transmit information, exchange information, capture measurements, and so on. The specific I/O components 1050 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion and the grouping is in no way limiting. In various example embodiments, the I/O components 1050 may, include output components 1052 and input components 1054. The output components 1052 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, and other communication components to provide communication via other modalities. The devices 1070 may be another machine or any of a wide variety of peripheral devices (e.g., a peripheral device coupled via a universal serial bus (USB)). For example, as noted above, the machine 1000 may correspond to any one of the remote computing device 106, the access management system 110, the compute service manager 112, the execution platform 114, the access management system 118, the Web proxy 120, and the devices 1070 may include any other of these systems and devices.

The various memories (e.g., 1030, 1032, 1034, and/or memory of the processor(s) 1010 and/or the storage unit 1036) may store one or more sets of instructions 1016 and data structures (e.g., software) embodying or utilized by any one or more of the methodologies or functions described herein. These instructions 1016, when executed by the processor(s) 1010, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., hypertext transfer protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1

A method comprising: receiving, by one or more processors, login information for a global identity; based on the login information, authenticating the global identity; establishing a login session providing access to a plurality of accounts; from the login session, performing a first task using a first account from the plurality of accounts; and from the login session, performing a second task using a second account from the plurality of accounts.

Example 2

The method of example 1, wherein the login session provides access to the plurality of accounts without further authentication.

Example 3

The method of any of examples 1-2, wherein performing the first task using the first account comprises: establishing a remote session with a deployment associated with the first account; transmitting a request to execute the first task to the deployment associated with the first account, wherein the task is executed in the remote session generating a result; and receiving the result Example 4

The method of any of examples 1-3, further comprising: creating a proxy user for the remote session, the proxy user being associated with the global identity.

Example 5

The method of any of examples 1-4, further comprising: establishing a second remote session with a deployment associated with the second account; transmitting a second request to execute the second task to the deployment associated with the second account, wherein the task is executed in the second remote session generating a second result; and receiving the second result Example 6

The method of any of examples 1-5, further comprising: providing a session pool of active remote sessions in parallel allowing switching by the global identity between the active remote sessions.

Example 7

The method of any of examples 1-6, wherein the plurality of accounts are selected based on a policy rule related to type of accounts.

Example 8

The method of any of examples 1-7, wherein the first account is associated with a first deployment and the second account is associated with a second deployment.

Example 9

The method of any of examples 1-8, further comprising: creating a table associated with the login session; and in response to the login session being terminated, deleting the table.

Example 10

A system comprising: one or more processors of a machine; and a memory storing instructions that, when executed by the one or more processors, cause the machine to perform operations implementing any one of example methods 1 to 9.

Example 11

A machine-readable storage device embodying instructions that, when executed by a machine, cause the machine to perform operations implementing any one of example methods 1 to 9.

What is claimed is:

1. A method comprising:
receiving, by one or more processors, login information for a global identity;
based on the login information, authenticating the global identity by creating a one-way trust relationship within an organization;
establishing a login session providing access to a plurality of accounts associated with the organization based on the one-way relationship;
receiving a command to execute an operation;
determining that the command involves performing a plurality of tasks using the plurality of accounts;
from the login session associated with the global identity, performing a first task of the plurality of tasks using a first account from the plurality of accounts by establishing a first remote session having a first remote session ID with a deployment associated with the first account using a first proxy user associated with the global identity;
from the login session associated with the global identity, performing a second task of the plurality of tasks using a second account from the plurality of accounts by establishing a second remote session having a second remote session ID with a deployment associated with the second account using a second proxy user associated with the global identity;
receiving results from the first and second remote sessions; and
combining the results received from the first and second remote sessions to provide a final result for executing the operation.

2. The method of claim 1, wherein the login session provides access to the plurality of accounts without further authentication.

3. The method of claim 1, wherein performing the first task using the first account comprises:
transmitting a request to execute the first task with a first task ID to the deployment associated with the first account, wherein the first task is executed in the first remote session generating a first result; and
receiving the first result.

4. The method of claim 3, further comprising:
creating the first proxy user for the first remote session having at least one property value indicating that the first proxy user is standing in for the global identity.

5. The method of claim 3, further comprising:
transmitting a second request to execute the second task with a second task ID to the deployment associated with the second account, wherein the second task is executed in the second remote session generating a second result; and
receiving the second result.

6. The method of claim 1, further comprising:
providing a session pool of active remote sessions in parallel allowing switching by the global identity between the active remote sessions.

7. The method of claim 1, wherein the plurality of accounts are selected based on a policy rule related to type of accounts.

8. The method of claim 1, wherein the first account is associated with a first deployment and the second account is associated with a second deployment.

9. The method of claim 1, further comprising:
creating a table associated with the login session; and
in response to the login session being terminated, deleting the table.

10. A non-transitory machine-storage medium embodying instructions that, when executed by a machine, cause the machine to perform operations comprising:
receiving, by one or more processors, login information for a global identity;

based on the login information, authenticating the global identity by creating a one-way trust relationship within an organization;

establishing a login session providing access to a plurality of accounts associated with the organization based on the one-way relationship;

receiving a command to execute an operation;

determining that the command involves performing a plurality of tasks using the plurality of accounts;

from the login session associated with the global identity, performing a first task of the plurality of tasks using a first account from the plurality of accounts by establishing a first remote session having a first remote session ID with a deployment associated with the first account using a first proxy user associated with the global identity;

from the login session associated with the global identity, performing a second task of the plurality of tasks using a second account from the plurality of accounts by establishing a second remote session having a second remote session ID with a deployment associated with the second account using a second proxy user associated with the global identity;

receiving results from the first and second remote sessions; and combining the results received from the first and second remote sessions to provide a final result for executing the operation.

11. The non-transitory machine-storage medium of claim 10, wherein the login session provides access to the plurality of accounts without further authentication.

12. The non-transitory machine-storage medium of claim 10, wherein performing the first task using the first account comprises:

transmitting a request to execute the first task with a first task ID to the deployment associated with the first account, wherein the first task is executed in the first remote session generating a first result; and receiving the first result.

13. The non-transitory machine-storage medium of claim 12, further comprising:

creating the first proxy user for the first remote session having at least one property value indicating that the first proxy user is standing in for the global identity.

14. The non-transitory machine-storage medium of claim 12, further comprising:

transmitting a second request to execute the second task with a second task ID to the deployment associated with the second account, wherein the second task is executed in the second remote session generating a second result; and receiving the second result.

15. The non-transitory machine-storage medium of claim 10, further comprising:

providing a session pool of active remote sessions in parallel allowing switching by the global identity between the active remote sessions.

16. The non-transitory machine-storage medium of claim 10, wherein the plurality of accounts are selected based on a policy rule related to type of accounts.

17. The non-transitory machine-storage medium of claim 10, wherein the first account is associated with a first deployment and the second account is associated with a second deployment.

18. The non-transitory machine-storage medium of claim 10, further comprising:

creating a table associated with the login session; and in response to the login session being terminated, deleting the table.

19. A system comprising:

one or more processors of a machine; and a memory storing instructions that, when executed by the one or more processors, cause the machine to perform operations comprising:

receiving, by one or more processors, login information for a global identity;

based on the login information, authenticating the global identity by creating a one-way trust relationship within an organization;

establishing a login session providing access to a plurality of accounts associated with the organization based on the one-way relationship;

receiving a command to execute an operation;

determining that the command involves performing a plurality of tasks using the plurality of accounts;

from the login session associated with the global identity, performing a first task of the plurality of tasks using a first account from the plurality of accounts by establishing a first remote session having a first remote session ID with a deployment associated with the first account using a first proxy user associated with the global identity;

from the login session associated with the global identity, performing a second task of the plurality of tasks using a second account from the plurality of accounts by establishing a second remote session having a second remote session ID with a deployment associated with the second account using a second proxy user associated with the global identity;

receiving results from the first and second remote sessions; and combining the results received from the first and second remote sessions to provide a final result for executing the operation.

20. The system of claim 19, wherein the login session provides access to the plurality of accounts without further authentication.

21. The system of claim 19, wherein performing the first task using the first account comprises:

transmitting a request to execute the first task with a first task ID to the deployment associated with the first account, wherein the first task is executed in the first remote session generating a first result; and receiving the first result.

22. The system of claim 21, the operations further comprising:

creating the first proxy user for the first remote session having at least one property value indicating that the first proxy user is standing in for the global identity.

23. The system of claim 21, the operations further comprising:

transmitting a second request to execute the second task with a second task ID to the deployment associated with the second account, wherein the second task is executed in the second remote session generating a second result; and receiving the second result.

24. The system of claim 19, the operations further comprising:

providing a session pool of active remote sessions in parallel allowing switching by the global identity between the active remote sessions.

25. The system of claim 19, wherein the plurality of accounts are selected based on a policy rule related to type of accounts.

26. The system of claim 19, wherein the first account is associated with a first deployment and the second account is associated with a second deployment.

27. The system of claim 19, the operations further comprising:
   creating a table associated with the login session; and
   in response to the login session being terminated, deleting the table.

* * * * *